Oct. 18, 1938.   D. E. GRAY   2,133,662
METHOD OF AND APPARATUS FOR DRAWING GLASS
Filed April 10, 1936
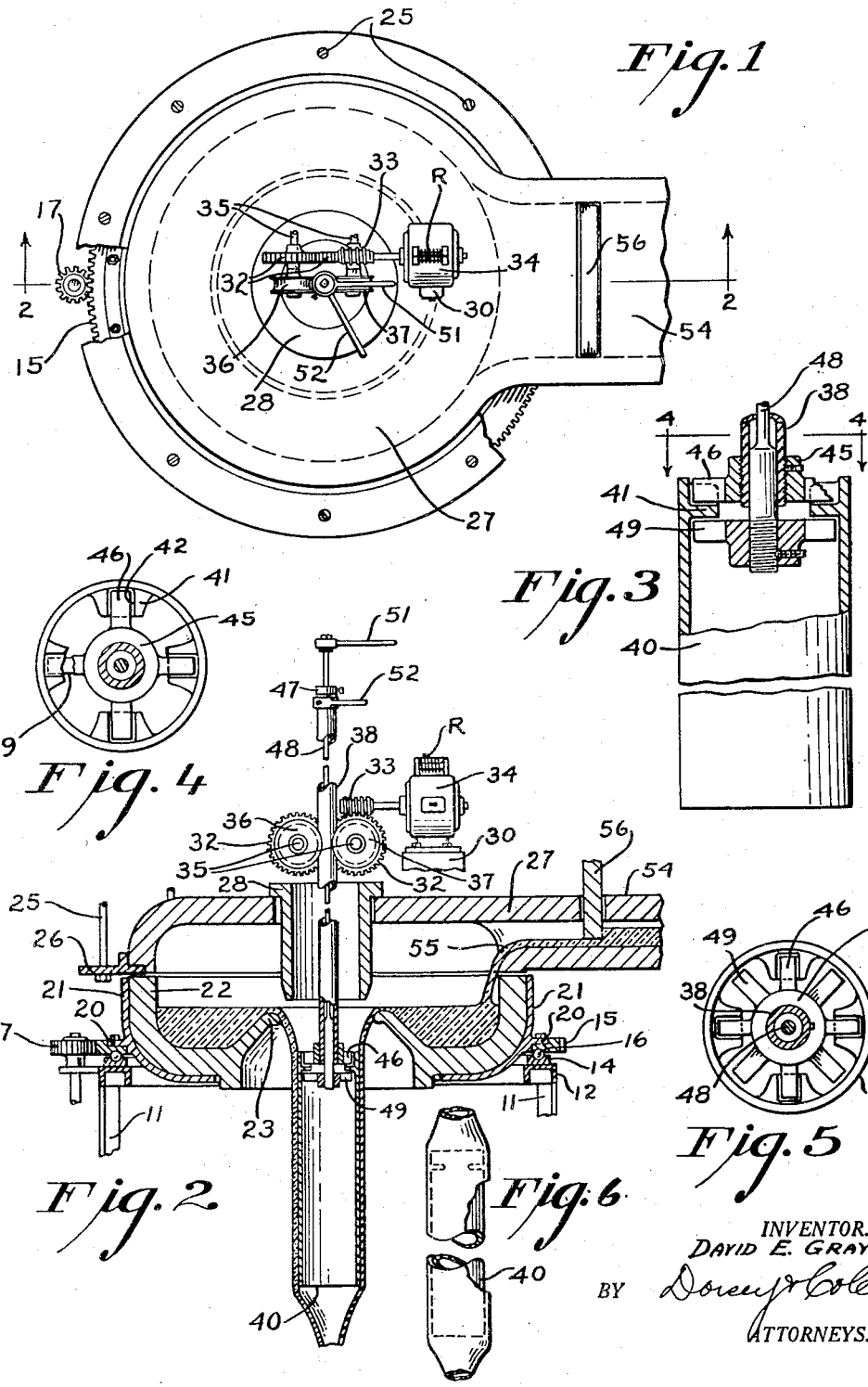
INVENTOR.
DAVID E. GRAY
BY Dorsey & Cole
ATTORNEYS.

Patented Oct. 18, 1938

2,133,662

UNITED STATES PATENT OFFICE 2,133,662

METHOD OF AND APPARATUS FOR DRAWING GLASS

David E. Gray, Corning, N. Y., assignor to Corning Glass Works, Corning, N. Y., a corporation of New York Application April 10, 1936, Serial No. 73,737

7 Claims. (Cl. 49—17.1)

This invention relates to a method of and apparatus for performing glass drawing operations, and more particularly to the drawing of glass tubing and cylinders of predetermined internal diameters from molten glass as it flows from a container such as a melting tank or pot.

As far as I am aware methods of manufacturing tubing and cylinders of accurate internal diameter have involved first forming a hollow glass blank or tube and then subjecting it to a subsequently more or less expensive operation to insure accuracy of its internal bore. For example, the manufacture of glass tubing and cylinders and like ware having exact internal diameters and capacities have in the past required either the costly process of grinding the preformed tubing and cylinders to a predetermined internal diameter, or the reheating and reshaping of preformed glass tubing. The latter method of procedure is described in Patent No. 1,301,714, granted April 22, 1919 to Karl Kueppers.

An object of this invention is to form glass tubing of predetermined exact internal form and cross-section directly from a mass of molten glass so as to eliminate the labor and expense of first forming a tubular blank upon which subsequent resizing operations must be performed.

Another object of the invention is to provide apparatus by means of which the formation of tubes or cylinders of a uniform bore may be carried on in a continuous manner.

Among its features my invention embodies flowing a hollow stream of molten glass from a container, introducing a mandrel of predetermined size and shape at a controlled rate of speed into the glass as it flows from the container, thereafter permitting the mandrel to move by gravity with the encasing glass, separating the glass containing the mandrel from the flowing stream, allowing the glass and mandrel to cool so as to permit the latter to shrink, removing the ends of the glass which project beyond the ends of the mandrel, withdrawing the mandrel from the glass surrounding it and finishing the ends of the glass tube or cylinder thus formed.

In the accompanying drawing I have shown one embodiment of my invention in which:

Fig. 1 is a plan view of a forehearth and tube drawing bowl;

Fig. 2 is an elevational view, partly in section, taken on the line 2—2 of Fig. 1;

Fig. 3 is an enlarged elevational view, partly in section, of the mandrel and a portion of the carrier;

Fig. 4 is a transverse sectional view taken on the line 4—4 of Fig. 3;

Fig. 5 is a view similar to Fig. 4 with certain parts thereof shown in position to release the mandrel from its carrier; and Fig. 6 is a view showing a mandrel encased in drawn glass and prior to the finishing of the cylinder.

Referring to the drawing in detail, and particularly to Fig. 2, a circular channel member 12 is supported on the legs 11 of a suitable base (not shown). Rotatable on member 12 is a gear 15 having a ball race formed on the bottom side thereof which co-acts with the balls 16 and a ball race 14 supported by member 12. A pinion 17, driven by any suitable power source (not shown), engages the gear 15 to transmit motion thereto.

Supported by a lateral flange 20 and secured to the gear 15 is an annular and bowl-shaped casing 21 which is rotatable with the gear. Seated in the casing 21 is a refractory bowl 22 having a central opening which is surrounded by a refractory cone 23 and which extends upwardly into and above the upper face of the bottom of the bowl. The upper end of the cone 23 is formed with an inwardly extending annulus to form a circular discharge orifice.

A refractory cover 27 which is in part dome shaped is supported by an annular casting 26 suspended from a suitable overhead member (not shown), and has its lower edge extending over the upper edge of the bowl 22. The cover 27 has a centrally located opening through which a sleeve 28, of refractory material, depends and which serves to form a wall terminating close to the level of the molten glass to prevent the escape of heat through the opening in the cover.

Supported on a suitable base 30 at the desired distance above the tube drawing bowl is a core suspending mechanism (Fig. 2). This mechanism comprises worm gears 32 driven by a worm 33 and a motor 34 operated from a suitable current source, and including a speed regulating rheostat R. On the shafts 35 of the worm gears 32 there is fixed a pair of friction pulleys 36 and 37 which engage a tubular rod 38 at the lower end of which there is detachably supported a bore forming mandrel 40.

The bore forming mandrel 40 is provided adjacent its upper end with internal lugs 41 which are formed in their upper faces with indents or recesses 42 for receiving radial prongs 46 of a locking member 45 (Fig. 4) secured to the lower end of rod 38. Rotatably mounted within the tubular rod 38 is a suspension rod 48 having at its upper portion a stop collar 47 (Fig. 2) for preventing downward axial movement of the suspension rod 48 with respect to rod 38, and at its lower end is a spider 49 (Fig. 3) for engagement with the bottom faces of the lugs 41 by means of which the mandrel 40 is suspended. This spider 49 slidably engages with the under side of the lugs 41 and when in locking position its prongs are in vertical alignment with the locking prongs 46. Hand levers 51 and 52 (Fig. 2) are fixed to the upper ends of the rods 48 and 38 for imparting a relative turning movement to the rods and to rotate the spider 49 relative to the locking member 45 to thereby release the mandrel 40.

The spider 49 is clearly shown in its releasing position in Fig. 5.

In operation, the bowl 22 is rotated by means of the drive pinion 17, and a stream of molten glass 55, regulated by a suitable gate 56, flows into the bowl from the forehearth 54. As the glass fills the bowl and flows over the curb of the cone 23, it forms an annular stream. As the annular stream of glass flows downwardly, a mandrel is lowered by means of the motor controlled suspension mechanism 31 and advanced into the stream, becoming entrapped therein. Surface tension and the effect of drawing the hollow stream of molten glass causes the glass to shrink upon the mandrel as it is introduced into the stream. At the same time the mandrel absorbs heat from the molten glass and expands outwardly against it. The combination of these two actions insures intimate contact between the glass and the mandrel. The descent of the mandrel is definitely controlled with relation to the flow of the glass until its sides are entirely covered by the molten glass, after which the levers 51 and 52 of the suspension mechanism are operated to release the mandrel so as to permit the mandrel and glass encasing it to fall by gravity and cause contraction of the stream of glass above the mandrel and thus entirely entrap the mandrel within the glass. The glass containing the mandrel is then severed from the stream and transferred to an annealing atmosphere or permitted to cool naturally as desired. Obviously the speed of movement of the mandrel may be varied to cause it to enter the glass at a desired rate and according to the viscosity of the glass in order that cylinders of definite inside diameter but of differing wall thicknesses may be produced, it being understood that the more rapid the travel of the mandrel into the glass the thinner the wall thickness of the finished product. The rheostat R comprises one means by which the speed of movement of the mandrel may be varied. The mandrel, being made of a material having a greater thermal coefficient of expansion than that of the glass, will shrink more rapidly than the glass as the cooling takes place so that it becomes loosened from the glass and therefore, after the ends of the cylinder are removed, it can be freely withdrawn from the interior of the glass cylinder.

Although I have described the method of forming one cylinder by the use of a single mandrel, it is to be understood that continuous operation may be accomplished by successively introducing mandrels into the stream. Therefore, continuous production of glass cylinders of accurate internal diameter would include the use of a number of bore forming mandrels successively discharged into the glass stream.

I claim:

1. The method of making glass tubing having a predetermined internal configuration, which includes introducing a mandrel into a hollow stream of molten glass, cooling the glass and mandrel to cause the glass to set and the mandrel to shrink, and removing the mandrel from the glass.

2. The method of making glass tubing having a predetermined internal configuration, which includes introducing a mandrel into a hollow stream of molten glass, and removing the mandrel from the glass after cooling and consequent shrinkage of the mandrel have taken place.

3. The method of making sections of glass tubing and cylinders having a predetermined internal diameter, which includes flowing molten glass in a continuous hollow stream directly from a bath of molten glass and successively advancing bore forming mandrels into the stream.

4. In an apparatus for the formation of glass tubes or cylinders, a container for molten glass having an annular outlet, a mandrel having an exterior conforming substantially to that of the internal diameter of a tube or cylinder to be formed, means including a shaft detachably secured to said mandrel for lowering said mandrel into the bore of a tubular stream of molten glass flowing from said outlet and the downward movement continued at a definitely regulated speed until the mandrel is completely surrounded, and means for then releasing said mandrel from said shaft.

5. In an apparatus for the manufacture of glass cylinders, a container for molten glass having an outlet, a mandrel, a movable support for lowering said mandrel at a predetermined speed into and through a tubular stream of molten glass flowing from the outlet, and means for then releasing said mandrel from said support.

6. In a glass forming device, the combination of a container for molten glass having an outlet, a mandrel, means for lowering said mandrel at a definitely controlled speed into an annular stream of glass flowing from the outlet until said mandrel is completely surrounded with glass, and means for then releasing said mandrel from said first means.

7. Apparatus for drawing glass cylinders, comprising a receptacle having its inner walls converging to a drawing opening, a mandrel, means for lowering said mandrel into said receptacle and through the opening, means for supplying molten glass to said receptacle whereby glass will issue in an annular stream through space between said mandrel and the wall of said drawing opening and conform to the configuration of said mandrel, and means for then releasing said mandrel from said mandrel lowering means.

DAVID E. GRAY.